United States Patent Office 3,534,024
Patented Oct. 13, 1970

3,534,024
STEROID PHOSPHITES AND PROCESSES FOR THEIR PREPARATION
John G. Moffatt, Los Altos, Calif., assignor to Syntex Corporation, Panama, Panama, a corporation of Panama
No Drawing. Filed Mar. 15, 1968, Ser. No. 713,296
Int. Cl. C07c 169/08, 173/10
U.S. Cl. 260—239.5                    25 Claims

ABSTRACT OF THE DISCLOSURE

Water-soluble salts of steroid phosphites, prepared from the corresponding 3-, 17β- or 21-hydroxy steroids of the androstane, estrane or pregnane series exhibit anabolic, estrogenic or progestational activity; process for preparing steroid phosphite salts by treating hydroxy steroids either with phosphorous acid and a carbodiimide optionally in the presence of a weak base or with a trisubstituted phosphite in the presence of a hydrogen halide to obtain the corresponding steroid phosphites, and then treating the thus prepared steroid phosphites with ammonium hydroxide or an alkali metal hydroxide.

The present invention pertains to novel water-soluble steroid phosphite derivatives and to processes for their preparation.

In particular, the present invention is directed to the novel water-soluble steroid phosphite salts which can be prepared from the corresponding hydroxy steroids. The novel steroid phosphite salts, the corresponding steroid phosphites, the corresponding hydroxy steroids, and the novel processes can be illustrated by the following reaction sequences [(A), (B) and (C)], using partial formulas:

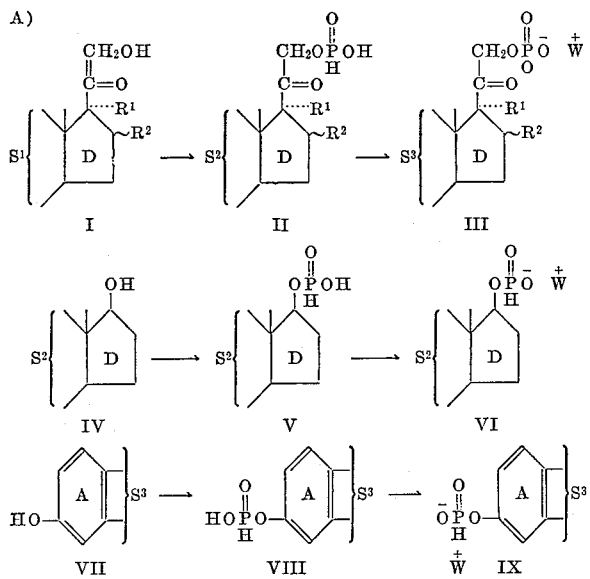

wherein

W is the cation of ammonia or an alkali metal, such as the cations of lithium, sodium or potassium;
$R^1$ is hydrogen, hydroxy or a conventional hydrolyzable ester;
$R^2$ is hydrogen, hydroxy, methyl, or a conventional hydrolyzable ester;
$R^1$ and $R^2$ taken together are the group

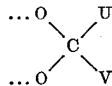

wherein each of U and V is hydrogen, lower alkyl, cycloalkyl, or phenyl;
$S^1$ is one of the group;

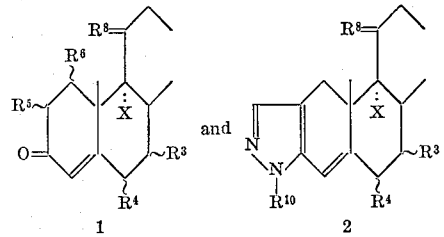

$S^2$ is one of the group;

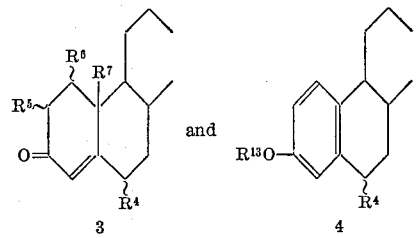

$S^3$ is the group;

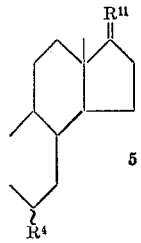

in which $R^3$ is hydrogen;
$R^4$ is hydrogen, methyl, fluoro or chloro;
$R^3$ and $R^4$ when taken together are a carbon-carbon double bond or the group

wherein each of $X^1$ and $X^2$ is hydrogen, fluoro or chloro;
each of $R^5$ and $R^6$ is hydrogen;
$R^5$ and $R^6$ when taken together are a carbon-carbon double bond;
$R^7$ is hydrogen or methyl; provided $R^7$ is methyl when $R^5$ and $R^6$ taken together are a double bond;
$R^8$ is O= or the group

wherein $R^9$ is hydroxy or chloro;
$R^{10}$ is hydrogen, lower alkyl, cycloalkyl, phenyl, or p-halophenyl;
$R^{11}$ is O= or the group

$R^{12}$ is hydrogen, lower alkyl, lower alkenyl, lower haloalkenyl, lower alkynyl or lower haloalkynyl;
$R^{13}$ is hydroxy, a conventional hydrolyzable ether group or a conventional hydrolyzable ester group; and
X is hydrogen, fluoro or chloro, provided that when one of X and $R^9$ is chloro, the other is chloro.
A and D designate the A and D rings of the steroid molecules respectively.

The ~ line at positions C-1, 2, 4, 16 and 17 indicates that the substituent attached thereto can be in either the alpha or beta configuration at those positions.

The steroids of Formulas I, IV and VII are the starting steroids; the steroids of Formulas II, V and VIII are the corresponding novel steroid phosphites; and the steroids of Formulas III, XI and IX are the corresponding novel water-soluble steroid phosphite alkali metal salts.

$S^1$, $S^2$ and $S^3$ represent the remainder of the steroid molecule. Accordingly, the steroids of Formula III can also be represented by the following formulas in which the $S^1$ groups are shown attached to Formula III.

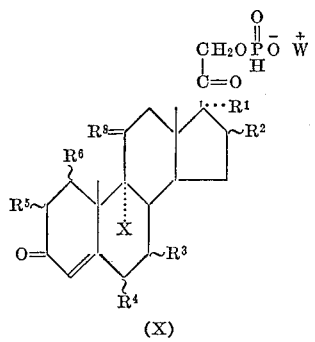

(X)

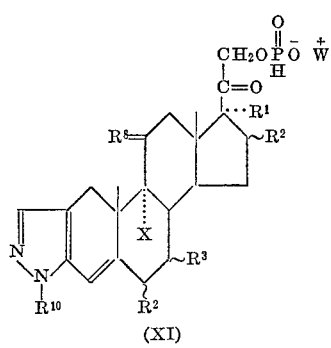

(XI)

Likewise the steroids of Formula VI can be represented by the following formulas, in which $S^2$ groups are shown attached to Formula VI:

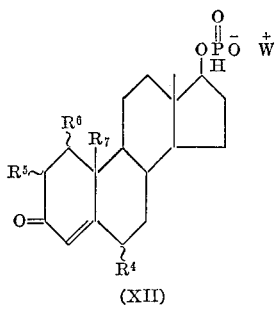

(XII)

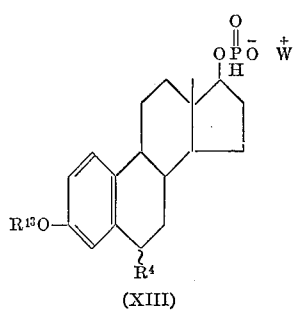

(XIII)

and the steriod of Formula IX can be represented by the following formula, in which $S^3$ groups are shown attached to Formula IX:

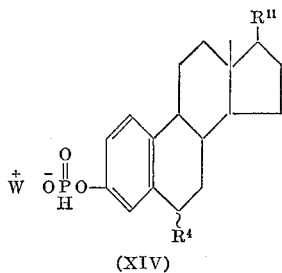

(XIV)

By the term "lower alkyl" is meant saturated aliphatic hydrocarbons that are straight or branched chain of from one to six carbon atoms. Typical lower alkyls include methyl, ethyl, isopropyl, butyl, isobutyl, tert-butyl, n-pentyl, isopentyl, neopentyl, 2-pentyl, 3-pentyl, 2-isopentyl, 3-isobutyl, n-hexyl, isohexyl, neohexyl, 2-ethylbutyl, 4-methylpentyl, and the like.

By the term "cycloalkyl" is meant saturated cyclic chain hydrocarbons from three to six carbon atoms optionally substituted with a methyl, ethyl or isopropyl group. Typical cycloalkyls include cyclopropyl, cyclobutyl, cyclopentyl, 3,4-dimethylcyclopentyl, cyclohexyl, 4-methylcyclohexyl, 4-isopropylcyclohexyl, and the like.

By the term "lower alkenyl" is meant olefinic aliphatic straight or branched chain hydrocarbons of from two to six carbon atoms of the formula

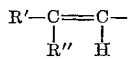

in which each of R' and R" is hydrogen or alkyl of from one to four carbon atoms; provided when both R' and R" are alkyl, the two alkyls cumulatively have no more than four carbon atoms. Typical lower alkenyls include ethenyl, methylethenyl, ethylethenyl, propylethenyl, 1-propylethenyl, butylethenyl, isobutylethenyl, tert-butylethenyl, and the like.

The term "lower halo alkenyl" denotes olefinic aliphatic straight or branched chain hydrocarbons of from 1 to 6 carbon atoms substituted with 1 to 3 fluoro or chloro groups. Typical lower halo alkenyls include 2-fluorovinyl, 2-chlorovinyl, 3,3,3-trifluoroprop-1-enyl, and the like.

By the term "lower alkynyl" is meant acetylenic aliphatic hydrocarbons that are straight or branched chain with 1 or 2 acetylenic bonds of from 2 to 6 carbon atoms. When modified by the term "halo," such halo lower alkynyls are substituted with 1 to 3 fluoro or chloro atoms. Typical lower alkynyls and halo lower alkynyls include ethynyl, propynyl, but-1-ynyl, hex-1,3-diynyl, 1-chloroethynyl, 3,3,3-trifluoropropynyl, and the like.

The term "conventional hydrolyzable ester" as used herein denotes those hydrolyzable ester groups conventionally employed in the steroid art, preferably those derived from hydrocarbon carboxylic acids. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy, containing up to six carbon atoms, acyloxy containing up to twelve carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, admantoate, glycolate, methoxyacetate, hemisuccinate, hemiadipate, hemi-β,β- dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, and the like.

The term "conventional hydrolyzable ether" as used herein denotes those hydrolyzable ether groups conventionally employed in the art, preferably those derived from normal, branched chain and cyclic hydrocarbons and aromatic hydrocarbons of from one to 12 carbon atoms. The term "hydrocarbon" defines both substituted and unsubstituted hydrocarbons. Typical substituted groups include hydroxy, alkoxy containing up to six carbon atoms, acyloxy containing up to six carbon atoms, nitro, amino, halo, azo, and the like. These hydrocarbons (except for the aromatic hydrocarbons) can be completely saturated or possess (excluding aromatic hydrocarbons) varying degrees of unsaturation. Preferably they contain from one to 12 carbon atoms. Typical conventional hydrolyzable ethers thus include methoxy, ethoxy, propoxy, 2-propoxy, cyclopropoxy, butoxy, 2-butoxy, t-butoxy, cyclobutoxy, pentoxy, 3-pentoxy, cyclopentoxy, hexoxy, cyclohexoxy, methoxymethoxy, 2-methoxyethoxy, 2-ethoxyethoxy, 2-aminoethoxy, 2-chloroethoxy, 3-fluorobutoxy, 2-acetoxyethoxy, 3-nitropropoxy, 3 - aminocyclobutoxy, 4-hexylcyclohexoxy, 2-phenoxyethoxy, phenoxy, tolyloxy, chlorophenoxy, m,m'-dimethylphenoxy, p-nitrophenoxy, β-chloropropoxy, p - aminophenoxy, tetrahydrofuran-2'-yloxy, tetrahydropyran-2'-yloxy, and the like.

As stated above, the present novel steroid phosphite salts are water-soluble. Accordingly, the present steroid phosphite salts can be formulated into aqueous solutions. Such aqueous solutions can consist wholly of water and one or more steroid phosphite salts, or they can be comprised of water, one or more steroid phosphite salts and one or more pharmaceutically acceptable water-soluble compounds, such as sodium chloride, sodium lactate, potassium chloride, calcium chloride, calcium gluconate, glucose, lactose, glycerol, ethanol, and the like.

The present novel water-soluble steroid phosphites of Formulas X and XI exhibit anti-inflammatory and glucocorticoid activity. The compounds are useful in the treatment of skin diseases, such as dermatoses; musculoskeletal and collagen diseases, such as rheumatoid arthritis; allergic diseases, such as asthma; and the like. These novel steroid phosphites are administered via the usual pharmaceutically acceptable routes, such as orally, or parenterally, at dosages of from about .001 mg. to about 2.0 mg. per kilogram of body weight, or topically at dosage concentrations of about 0.01% to about 1.0%.

The present novel water-soluble steroid phosphites of Formulas XIII and XIV exhibit estrogenic activity and accordingly are useful in the treatment of the climacteric syndrome, primary amenorrhea, osteoporosis, lactation inhibition, and other like conditions. These novel steroid phosphites are administered via the usual pharmaceutically acceptable routes, such as orally, or parenterally at dosages of from about 0.01 mg. to about 1.0 mg. per kilogram of body weight.

The present novel water-soluble steroid phosphites of Formula XII exhibit androgenic and anabolic activity. These compounds are useful in the treatment of primary or secondary hypogonadism, cryptorchism, and like conditions; and in fertility control. These steroids are administered in the usual pharmaceutically-acceptable routes, such as orally, or parenterally, at dosages of from about 0.01 mg. to about 1.0 mg. per kilogram of body weight.

Orally, the present phosphite compounds are administered as solids in the form of pills, tablets, powders (free or encapsulated), and the like; or as liquids in the form of solutions (aqueous or non-aqueous), suspensions (aqueous and non-aqueous), syrups, and the like.

Parenterally, the present steroid phosphite salts are preferably administered as liquids in the form of aqueous solutions. However, the present steroid phosphite salts can also be administered as non-aqueous suspensions or solutions, or as solids (in the form of pellets, tablets, and the like) parenterally.

The present novel steroid phosphite salts exhibiting anti-inflammatory activity can be administered alone or in combination with one or more pharmaceutically accepted therapeutic agents, such as anti-biotics.

The dosage of the novel steroid phosphite salts that is administered and the route of administration will normally be governed by the type of activity exhibited by the compound (estrogenic, androgenic, and the like), the specific activity of the compound, the condition of the subject, the condition to be treated, and the like.

When employing the present steroid phosphites, frequent periodic administrations are not required to maintain a given concentration. While not intending to be limited by a theoretical explanation, this phenomenon appears to occur because the phosphite esters are more slowly hydrolyzed by known enzymes in comparison with the hydrolysis of other ester groups, such as phosphate esters, acyl esters, and the like. For example, the phosphate ester group of steroid 21-phosphates is readily hydrolyzed by E. coli alkaline phosphatase or calf intestinal phosphatase; whereas the steroid 21-phosphite sodium salts are only slowly hydrolyzed by these enzymes, that is, the phosphate group is hydrolyzed over one hundred times faster than the corresponding phosphite group.

As shown, hereinbefore, the present 21-steroid phosphite salts of Formula III are prepared from the corresponding 21-hydroxy starting steroids of Formula I, for example, 6α - fluoro-11β,21-dihydroxy-16α-methylpregna-1,4-diene-3,20-dione 21-phosphite salt is prepared from 6α - fluoro-11β,21-dihydroxy-16α-methylpregna-1,4-diene-3,20-dione; the present novel 17β-steroid phosphite salts of Formula VI are prepared from the corresponding 17β-hydroxy steroids of Formula IV, for example, 3 - methoxy-17β-hydroxyestra-1,3,5(10)-triene 17β-phosphite salt is prepared from 3-methoxy-17β-hydroxyestra-1,3,5(10)-triene; and the present novel 3-steroid phosphite salts of Formula IX are prepared from the corresponding 3-hydroxy steroids of Formula VII by the present novel processes, for example, 3,17β-dihydroxy-17α-ethynylestra-1,3,5(10)-triene 3-phosphite salt is prepared from 3,17β-dihydroxy-17α-ethynylestra-1,3,5(10)-triene.

The present novel process, by which the present phosphite compounds are prepared from the appropriate corresponding 3-, 17β- or 21-hydroxy starting steriod, is carried out by treating a hydroxy steroid of Formula I, IV or VII with phosphorous acid, and a disubstituted carbodiimide. Preferably the process is conducted in the presence of a weak base.

The reaction mixture is filtered and evaporated. The residue is partitioned between water and an organic solvent immiscible with water; the aqueous phase is chromatographed on diethylaminoethyl cellulose (HCO₃—) eluting with aqueous tirethylammonia bicarbonate. The eluted fraction containing the product, the corresponding steroid phosphite of Formulas II, V or VIII, is evaporated. The residue is dissolved in water, made basic by the addition of aqueous ammonium hydroxide or alkali metal hydroxide, such as sodium hydroxide or potassium hydroxide, and washed with a water-immiscible organic solvent; then it is acidified to pH 5 by the addition of an ion exchange resin, such as (H+) nuclear sulfonic acid styrene-divinylbenzene copolymer, filtered, and evaporated to give the corresponding steroid phosphite salt of Formulas III, VI or IX.

About 1 to about 3 molar equivalents of phosphorous acid and the disubstituted carbodiimide are employed per molar equivalent of hydroxy starting steroid, and preferably twice as many molar equivalents of the disubstituted carbodiimide are employed as phosphorous acid. Any amount of the weak base can be employed, if employed at all, and usually a sufficient amount is used to form a salt with the phosphorous acid.

Typical disubstituted carbodiimides that can be used in the present novel process include dialkyl carbodiimides such as dimethyl carbodiimide, dihexyl carbodiimide and the like; dicycloalkyl carbodiimides, such as dicyclopentyl carbodiimide, dicyclohexyl carbodiimide, and the like; diaryl carbodiimides, such as diphenyl carbodiimide, and the like. The preferred disubstituted carbodiimide is dicyclohexyl carbodiimide.

Suitable weak bases include organic bases, such as pyridine, dimethylaniline, quinoline, dimethylformamide, dimethylacetamide, and the like, preferably pyridine.

The present novel process is usually conducted in an inert, non-aqueous, organic solvent or mixtures of such solvents, that will dissolve the starting hydroxy steroid and the aforementioned reagents. Typical solvents include pyridine; ethers such as tetrahydrofuran, dioxane; N,N-dialkyl acid amides, such as dimethylformamide, dimethylacetamide, and the like.

The present process is normally carried out at temperatures in the range of from about −20° C. to about 150° C., conveniently at room temperature, for a period of from one to 48 hours.

Another novel process that is also employed to prepare the novel compounds of Formulas III, VI and IX is carried out by treating a starting hydroxy steroid of Formulas I, IV and VII with a trisubstituted phosphite in the presence of an anhydrous hydrogen halide in an inert, anhydrous, aprotic, organic solvent. After the reaction, the reaction mixture is made basic by the addition of a base. The reaction mixture is then evaporated to dryness and partitioned between water and an immiscible solvent, such as ether. The water layer is then chromatographed on an ion exchange resin (HCO$_3$—) or support, eluting with an aqueous salt solution. The fraction containing the product, a steroid of Formula II, V or VIII, is evaporated to dryness, added to aqueous ammonium or alkali metal hydroxide, washed with ether, acidified to about pH 5 by the addition of a cation exchange resin, filtered and evaporated, giving the corresponding steroid phosphite salt of Formula III, VI or IX.

The reactions with the trisubstituted phosphite and hydrogen halide are carried out at temperatures in the range of from about 0° C. to about 100° C., conveniently at room temperature, for a period of 1 to 48 hours.

The addition of base is generally performed rapidly, but the addition can be done over a period of time of from about 10 minutes to about 1 hour. After the addition, the basic reaction mixture is allowed to stand, optionally being agitated, for a period of time of about 10 minutes to about 48 hours at temperatures in the range of from 0° C. to about 100° C., conveniently at room temperature. At least a molar equivalent of the trisubstituted phosphite and the hydrogen halide are used per molar equivalent of hydroxy steroid. Generally, 2 to 10 molar equivalents of the trisubstituted phosphite are employed, and 1.1 to 2.0 molar equivalents of hydrogen halide.

Typical trisubstituted phosphites that are employed in the above novel process include trimethylphosphite, triethylphosphite, tirpropylphosphite, triphenylphosphite, tritolylphosphite, and the like, triphenylphosphite being preferred. Hydrogen chloride is the hydrogen halide normally used.

Typical aprotic organic solvents employed in the above process include dialkyl acid amides, such as dimethylformamide, dimethylacetamide, and the like.

Typical bases employed to make the reaction mixture basic include aqueous solutions of inorganic bases, such as ammonium hydroxide, sodium hydroxide, potassium hydroxide and the like, preferably ammonium hydroxide.

Other primary and secondary hydroxy groups on the starting steroids are protected by etherification or esterification prior to the above process to protect them from being attacked by the reagents. However, generally it is not necessary to protect 11β- and/or 17α-hydroxy groups present on the starting hydroxy steroids of the pregnane series, if present at all, because under the conditions of the present processes, these hydroxy groups are not affected. After the above process, the esterified or etherified hydroxy groups can be hydrolyzed to afford the free hydroxy groups. The hydroxy groups when etherified are preferably etherified to a tetrahydrofuran-2′-yloxy group.

The hydroxy starting steroids that can be employed in the present process are not limited to 3-, 17β-, or 21-hydroxy steroids, but rather, steroids possessing one or more primary or secondary hydroxy groups in other positions on the steroid nucleus or side chain can be used. Thus, steroids having one or more hydroxy groups at C-1, 2, 3, 4, 6, 7, 12, 15, 16, 18, 19, and 20, and the like, can be employed as starting materials.

All of the starting 21-hydroxy steroids of the pregnane series are known; moreover, all the steroids can be prepared according to conventional methods known to the art. For example, the starting steroids of Formula I can be prepared from the compounds of the following formulas:

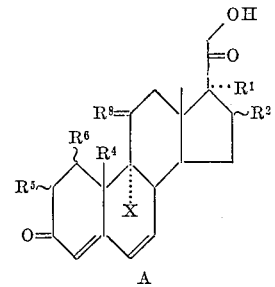

A

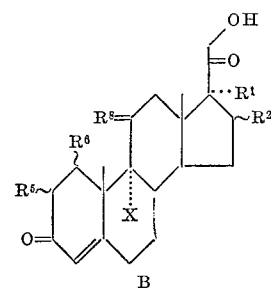

B wherein $R^1$, $R^2$, $R^4$, $R^5$, $R^6$, $R^8$ and X are as defined before.

The 6,7-monohalomethylene moiety is introduced by treating the $\Delta^{4,6}$ compound of Formulas A and B or the $\Delta^{1,4,6}$ compound of Formula A with an alkali metal salt of the acid of the formula W—CYZ—COOH in which W is chloro, bromo or iodo, and one of Y and Z is hydrogen, the other being fluoro or chloro. The reaction is conducted in an inert, non-aqueous, polar organic solvent, such as dimethyl diethylene glycol ether, at a temperature in the range of from about 60° C. to about 200° C. Preferably hydroxy groups are protected during the process, such as by etherification to a tetrahydropyranyl ether. By employing an alkali metal salt of the acid of the above formula where each of Y and Z is fluoro or chloro, a 6,7-dihalomethylene moiety is introduced. By treating a 6,7-dichloromethylene substituent with lithium aluminum hydride, the corresponding 6,7-methylene moiety is obtained.

The addition of the methylene, monohalomethylene, and dihalomethylene groups in accordance with the procedures set forth herein at position C–6,7 is accomplished with the orientation of the resultant fused grouping, including both isomeric alpha and beta configurations in variable ratios. The isomeric product mixture in each instance is conveniently and readily subjected to conventional techniques, such as chromatography, fractional crystallization, and the like, by which the alpha and beta isomers are separated by virtue of their different physical properties.

The [3,2-c] pyrazole moiety is generally the last moiety to be introduced.

The [3,2-c] pyrazole moiety is introduced by treating the 3-keto derivatives of the compound of Formula B with ethyl orthoformate and an alkali metal hydride, such as sodium hydride in an anhydrous, inert, organic solvent, such as aliphatic and aromatic hydrocarbons. At the completion of the reaction, the reaction products are hydrolyzed with an aqueous acid, such as aqueous hydrochloric acid, to afford the 2-hydroxymethylene derivative of Formula B. The 2-hydroxymethylene derivative is treated with an unsubstituted or monosubstituted hydrazine hydrochloride salt in a nitrogen gas atmosphere.

When a substituted hydrazine, such as phenyl hydrazine, is utilized in the above reaction, a mixture of two identifiable products is obtained; the 1'-substituted [2,3-D]pyrazole derivatives and the 2'-substituted [3,2-C] pyrazole derivatives. The two isomeric derivatives are separated by conventional techniques, such as chromatography, crystallization, and the like.

If the starting materials are 17α,21-dihydroxy-20-oxo steroids, the 17,20;20,21-bismethylenedioxy derivative thereof is prepared prior to the introduction of the C–6,7-methylene or halomethylene group or the [3,2-C]pyrazole moiety onto the steroid molecule. After the desired transformations, the bismethylenedioxy group is removed by conventional methods.

All the starting 17β-hydroxy steroids of the androstane and estrane series of Formula IV used to prepare the novel steroid 17β-phosphite alkali metal salts of Formula VI are known to the art; moreover they can be prepared by conventional means.

The starting 3β-hydroxy steroids of the $\Delta^{1,3,5(10)}$ estrane series of Formula VII employed in the preparation of the novel steroid 3β-phosphite alkali metal salts of Formula VII are also known to the art; these starting steroids can also be prepared by conventional techniques of the art.

The following examples are intended to further illustrate and typify the nature of this invention; they should not be construed as a limitation on the scope of this invention.

EXAMPLE 1

A mixture of 1.2 g. of 6α-fluoro-11β,17α,21-trihydroxy-16α-methylpregna-1,4-diene-3,20-dione and 0.5 g. of anhydrous, crystalline phosphorous acid was dissolved by agitation in 30 ml. of anhydrous pyridine. The solvent was then evaporated to dryness and replaced by 25 ml. of fresh, anhydrous pyridine. After the addition of 1.236 g. of dicyclohexylcarbodiimide the mixture was sealed and stored overnight; then 5 ml. of water were added, and after one hour at room temperature the mixture was filtered and the filtrate was evaporated to dryness. The residue was partitioned between 50 ml. of water and 50 ml. of ether, and the aqueous phase was applied to a 3 x 40 cm. column of diethylaminoethyl cellulose (HCO₃—). After a water wash the column was eluted with a linear gradient of 6 l. of triethylammonium bicarbonate (0.005 to 0.3 M). A large ultraviolet absorbing peak was eluted at roughly 0.15 M salt and was followed by minor amounts of a more ionic material at about 0.25 M salt. The major peak was pooled and evaporated to dryness followed by repeated evaporation with portions of methanol. The residue, comprising 6α-fluoro-11β,17α,21-trihydroxy-16α-methylpregna-1,4-diene-3,20-dione 21 - phosphite, was dissolved in water (10 ml.) and 1.2 equivalents of sodium hydroxide (based on the amount of 6α-fluoro-11β,17α,21 - trihydroxy-16α-methylpregna-1,4-diene-3,20-dione 21-phosphite present as measured by ultraviolet absorption at 242 m.) were added. The solution (pH 11) was extracted with methylene chloride then adjusted to pH 5 by portionwise addition of a cation exchange resin (H+), filtered and lyophilized to yield the sodium salt of 6α-fluoro-11β,17α,21-trihydroxy-16α-methylpregna-1,4-diene-3,20-dione 21-phosphite.

Similarly, the sodium salts of the following 21-phosphite steroids were prepared from the corresponding 21-hydroxy steroids by means of the above process:

11β,17α,21-trihydroxypregna-1,4-diene-3,20-dione 21-phosphite;
9α-fluoro-11β,16α,17α,21-tetrahydroxypregna-1,4-diene-3,20-dione 21-phosphite;
6α-methyl-11β,17α,21-trihydroxypregna-1,4-diene-3-20-dione 21-phosphite;
9α-fluoro-11β,17α,21-trihydroxy-16α-methylpregna-1,4-diene-3,20-dione 21-phosphite;
6α,9α-difluoro-11β,17α,21-trihydroxy-16α-methylpregn-4-ene-3,20-dione 21-phosphite;
6α-chloro-11β,17α,21-trihydroxy16β-methylpregna-1,4-diene-3,20-dione 21-phosphite;
6α-chloro-9α-fluoro-11β,17α,21-trihydroxypregn-4-ene-3,20-dione 21-phosphite;
6α-methyl-11β,17α,21-trihydroxy-16α-methylpregna-1,4-diene3,20-dione 21-phosphite;
9α,11β-dichloro-17α,21-dihydroxypregna-1,4-diene-3,20-dione 21-phosphite;
6α,9α,11β-tricholro-17α,21-dihydroxypregna-1,4-diene-3,20-dione 21-phosphite;
6α-methyl-9α,11β-dichloro-16α,17α-isopropylidenedioxy-21-hydroxypregna-1,4-diene-3,20-dione 21-phosphite;
6α-fluoro-9α,11β-dichloro-17α-acetoxy-21-hydroxypregn-4-ene-3,20-dione 21-phosphite;
6α,9α-difluoro-11β,21-dihydroxy-16α,17α-isopropylidenedioxypregna-1,4-diene-3,20-dione 21-phosphite;
6α-fluoro-11β,21-dihydroxy-16α,17α-isopropylidenedioxypregn-4-ene-3,20-dione 21-phosphite;
11β,17α,21-trihydroxy-16β-methyl-2'-phenylpregn-4-eno[3,2-C]pyrazole 21-phosphite;
9α-fluoro-11β,21-dihydroxy-16β-methyl-2'-methylpregn-4-eno[3,2-C]pyrazole 21-phosphite;
9α,11β-dichloro-17α,21-dihydroxypregn-4-eno[3,2-C]pyrazole 21-phosphite;
6α,16α-dimethyl-11β,17α,21-trihydroxy-2'-(p-chlorophenyl)pregn-4-eno[3,2-C]pyrazole 21-phosphite;
6α-fluoro-11β,17α,21-trihydroxy-16α-acetoxypregna-1,4-diene-3,20-dione 21-phosphite;
6α-fluoro-11β,21-dihydroxy-16α-methylpregn-4-ene-3,20-dione 21-phosphite;
6α,9α-difluoro-11β,21-dihydroxy-16α-methylpregn-4-ene-3,20-dione 21-phosphite;
6α,9α-difluoro-11β,-dihydroxy-16α-methylpregna-1,4-diene-3,20-dione 21-phosphite;
6α-fluoro-11β,17α,21-trihydroxy-16α-methylpregn-4-ene-3,20-dione 21-phosite;
6α-fluoro-11β,17α,21-trihydroxy-16α-methylpregna-1,4-diene-3,20-dione 21-phosphite;
6α,9α-difluoro-11β,17α,21-trihydroxy-16α-methylpregn-4-ene-3,20-dione 21-phosphite;
6α,9α-difluoro-11β,17α,21-trihydroxy-16α-methylpregna-1,4-diene-3,20-dione 21-phosphite;
6α-fluoro-11β-dihydroxy-16α-methyl-20-oxo-2'-(p-fluorophenyl)pregn-4-eno[3,2-C]pyrazole 21-phosphite;
6α,9α-difluoro-11β,21-dihydroxy-16α-methyl-20-oxo-2'-(p-fluorophenyl)pregn-4-eno[3,2-C]pyrazole 21-phosphite;
6α-fluoro-11β,17α,21-trihydroxy-16α-methyl-20-oxo-2'-(p-fluorophenyl)pregn-4-eno[3,2-C]pyrazole 21-phosphite;
6α,9α-difluoro-11β,17α,21-trihydroxy-16α-methyl-20-oxo-2'-(p-fluorophenyl)pregn-4-eno[3,2-C]prazole 21-phosphite;
6α,7α-difluoromethylene-11β,17α,21-trihydroxy-16α-methylpregna-1,4-diene 3,20-dione 21-phosphite;
6α,7α-dichloromethylene-11β,21-dihydroxy-17α-valeryloxypregna-1,4-diene 3,20-dione 21-phosphite; and
6α,7α-difluoromethylene-9α-fluoro-11β,21-dihydroxy-16β-methylpregn-4-ene-3,20-dione 21-phosphite.

EXAMPLE 2

Thirty grams of 3,17β-dihydroxy-17α-ethynylestra-1,3,5(10)-triene and 17 g. of anhydrous phosphorous acid are dissolved in 900 ml. of anhydrous pyridine; the resulting mixture is evaporated under reduced pressure. The resulting residue is taken up in 750 ml. of anhydrous pyridine containing 41 g. of dicyclohexyl carbodiimide. The resulting mixture is stirred for 14 hours under anhydrous conditions at room temperature; then 200 ml. of water are added and the aqueous mixture is filtered. The filtrate is evaporated, the resulting residue is partitioned between 1.5 l. of water and 1.5 l. of diethylether. The aqueous phase is chromatographed on a diethylaminoethyl (DEAE) cellulose column eluting with a linear gradient of 100 l. of aqueous triethylammonium bicarbonate (0.005 to 0.3 M). The largest fraction, identified by its ultraviolet absorption peak, was eluted, collected and evaporated to yield 3,17β-dihydroxy-17α-ethynylestra-1,3,5(10)-triene-3-phosphite. The alkali metal salt is prepared by the means described in Example 1.

Similarly, the following steroid 3-phosphite sodium salts are prepared from the corresponding 3-hydroxy steroids by means of the above process:

3-hydroxy-17α-ethynyl-17β-methoxyestra-1,3,5(10)-triene 3-trienephosphite;
3,17α-dihydroxy-17α-propynylestra-1,3,5(10)-triene 3-phosphite;
3-hydroxy-17α-ethynyl-17β-tetrahydrofuran-2'-yloxyestra1,3,5(10)-triene 3-phosphite; and
3,17β-dihydroxy-17α-ethylestra-1,3,5(10)-triene 3-phosphite.

Similarly, the following 17β-phosphite steroids are prepared from the corresponding 17β-hydroxy steroids by means of the above process;

3-methoxy-17β-hydroxyestra-1,3,5(10)-triene-17O-phosphite;
3-tetrahydropyran-2'-yloxy-17β-hydroxyestra-1,3,5(10)-triene 17β-phosphite;
17β-hydroxyandrost-4-en-3-one 17β-phosphite;
17β-hydroxyestr-4-en-3-one 17β-phosphite;
6α-methyl-17β-hydroxyandrost-4-en-3-one 17β-phosphite; and
17β-hydroxyestr-5-(10)-en-3-one 17β-phosphite.

EXAMPLE 3

A mixture of 3.7 g. of 6α-fluoro-11β,17α,21-trihydroxy-16α-methylpregna-1,4-diene-3,20-dione, 15.6 g. of triphenylphosphite, and 20 ml. of dimethylformamide is treated with 2 ml. of 5.6 M hydrogen chloride in dimethylformamide. The resulting mixture is stirred for 18 hours and then 200 ml. of aqueous 20% ammonia is added. This mixture is stirred for four hours and then washed with ether. The aqueous mixture is evaporated and the resulting residue is taken up in 100 ml. of water and chromatographed on diethylaminoethyl cellulose (HCO₃—) eluting with a linear gradient of 18 l. of triethylammonium bicarbonate (0.005 to 0.3 M). The fraction containing the product is identified by its large ultraviolet absorbing peak and is evaporated to dryness. The residue is repeatedly evaporated with portions of methanol. The residue, comprising 6α-fluoro-11β,17α,21-trihydroxy-16α-methylpregna-1,4-diene-3,20-dione 21-phosphite, is dissolved in an aqueous solution containing 1.15 molar equivalents of sodium hydroxide based upon the amount of the above steroid phosphite. The mixture is extracted several times with methylene chloride then adjusted to a pH 5 by the addition of a cation polystyrene exchange resin (H+), filtered and evaporated to yield 6α-fluoro-11β,17α,21-trihydroxy-16α-methylpregna-1,4-diene-3,20-dione 21-phosphite sodium salt.

EXAMPLE 4

Twenty grams of 3-acetoxy-17β-hydroxyestra-1,3,5(10)-triene 17β-phosphite sodium salt, prepared from 3-acetoxy-17β-hydroxyestra-1,3,5(10)-triene by means of the processes described in Examples 1, 2 and 3, are dissolved in 500 ml. of aqueous 0.2 M sodium hydroxide. The resulting mixture is adjusted to pH 5, after one hour, by the addition of (H+) polystyrene nuclear sulfonic acid ion exchange resin; the mixture is then filtered and evaporated. The product is isolated by means of the isolation procedure described in Example 1 to give 3,17β-dihydroxyestra-1,3,5(10)-triene 17β-phosphite sodium salt.

EXAMPLE 5

A mixture of 1.2 g. of 6α,9α-difluoro-11β,21-dihydroxy-16α,17α-isopropylidenedioxypregna-1,4-diene-3,20-dione and 0.5 g. of anhydrous, crystalline phosphorous acid was dissolved by agitation in 30 ml. of anhydrous pyridine. The solvent was then evaporated to dryness and replaced by 25 ml. of fresh, anhydrous pyridine. After the addition of 1.236 g. of dicyclohexylcarbodiimide, the mixture was sealed and stored overnight; then 5 ml. of water were added, and after one hour at room temperature the mixture was filtered and the filtrate evaporated to dryness. The residue was partitioned between 50 ml. of water and 50 ml. of ether, and the aqueous phase was applied to a 3 x 40 cm. column of diethylaminoethyl cellulose (HCO₃—). After a water wash, the column was eluted with a linear gradient of 6 l. of triethyl ammonium bicarbonate (0.005 to 0.3 M). A large ultraviolet absorbing peak was eluted at roughly 0.15 M salt was followed by minor amounts of a more ionic material at about 0.25 M salt. The major peak was pooled and evaporated to dryness, followed by repeated evaporation with portions of methanol. The residue, comprising 6α,9α-difluoro-11β,21-dihydroxy-16α,17α-isopropylidenedioxypregna-1,4-diene-3,20-dione 21-phosphite, was dissolved in water (10 ml.) and 1.2 equivalents of ammonium hydroxide (based on the amount of 6α,9α-difluoro-11β,21-dihydroxy-16α,17α-isopropylidenedioxypregna-1,4-diene-3,20-dione 21-phosphite present as measured by ultraviolet absorption at 242 m.) were added. The solution (pH 11) was extracted with methylene chloride, then adjusted to pH 5 by portionwise addition of a cation exchange resin (H+), filtered and lyophilized to yield the ammonia salt of 6α,9α-difluoro-11β,21-dihydroxy-16α,17α-isopropylidenedioxypregna-1,4-diene-3,20-dione 21-phosphite.

What is claimed is:
1. The compounds according to the following formulas:

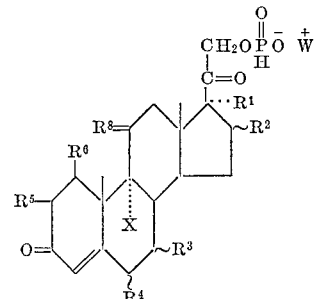

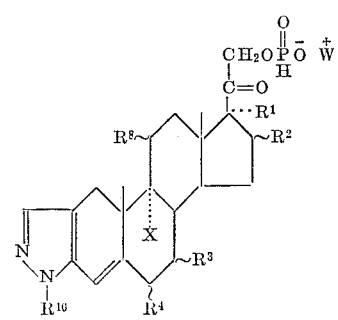

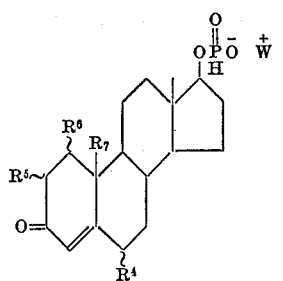

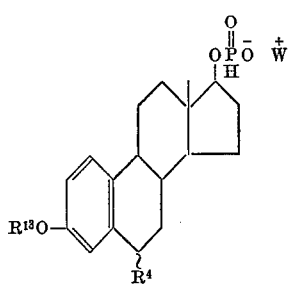

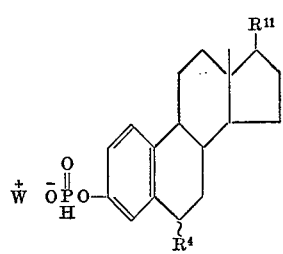

wherein

W is the cation of ammonia or an alkali metal;

$R^1$ is hydrogen, hydroxy, or a conventional hydrolyzable ester;

$R^2$ is hydrogen, hydroxy, methyl or a conventional hydrolyzable ester;

$R^1$ and $R^2$ taken together are the group

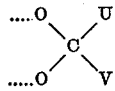

wherein each of U and V is hydrogen, lower alkyl, cycloalkyl, or phenyl;

$R^3$ is hydrogen;

$R^4$ is hydrogen, methyl, fluoro or chloro;

$R^3$ and $R^4$ when taken together are a carbon-carbon double bond or the group

wherein each of $X^1$ and $X^2$ is hydrogen, fluoro or chloro;
each of $R^5$ and $R^6$ is hydrogen;
$R^5$ and $R^6$ when taken together are a carbon-carbon double bond;
$R^7$ is hydrogen or methyl; provided $R^7$ is methyl when $R^5$ and $R^6$ taken together are a carbon-carbon double bond;
$R^8$ is O= or the group

wherein $R^9$ is hydroxy or chloro;

$R^{10}$ is hydrogen, lower alkyl, cycloalkyl, phenyl, or p-halophenyl;

$R^{11}$ is O= or the group

$R^{12}$ is hydrogen, lower alkyl, lower alkenyl, lower haloalkenyl, lower alkynyl or lower haloalkynyl;

$R^{13}$ is hydroxy, a conventional hydrolyzable ether group or a conventional hydrolyzable ester group; and X is hydrogen, fluoro or chloro, provided that when one of X and $R^9$ is chloro, the other is chloro.

2. The compounds according to claim 1 wherein
W is the cation of ammonia, sodium or potassium;
$R^1$ is hydrogen, hydroxy, acetoxy or valeryloxy;
$R^2$ is hydrogen, hydroxy, methyl or acetoxy;
$R^1$ and $R^2$ when taken together are 16α,17α-isopropylidenedioxy;
$R^3$ and $R^4$ when taken together are a carbon-carbon double bond;
$R^7$ is hydrogen or methyl, provided $R^7$ is methyl when $R^5$ and $R^6$ taken together are a carbon-carbon double bond;
$R^8$ is the group $$R^9 - \overset{H}{\underset{:}{\,}}$$

$R^{10}$ is hydrogen, methyl, phenyl or p-fluorophenyl;
$R^{12}$ is hydrogen, methyl, ethyl, vinyl or ethynyl;
$R^{13}$ is hydroxy, methoxy, ethoxy, tetrahydropyran-2'-yloxy, tetrahydrofuran-2'-yloxy, or acetoxy; and
X is hydrogen, fluoro or chloro, provided that when one of $R^9$ and X is chloro, the other is chloro.

3. A compound according to claim 2, 6α-fluoro-11β,21-dihydroxy - 16α - methylpregn - 4 - ene-3,20-dione 21-phosphite sodium salt.

4. A compound according to claim 2, 6α-fluoro-11β,21-dihydroxy-16α-methylpregna-1,4-diene-3,20 - dione 21-phosphite sodium salt.

5. A compound according to claim 2, 6α,9α-difluoro-11β,21-dihydroxy-16α-methylpregn-4-ene - 3,20 - dione 21-phosphite sodium salt.

6. A compound according to claim 2, 6α,9α-difluoro-11β,21-dihydroxy-16α-methylpregna - 1,4 - diene - 3,20-dione 21-phosphite sodium salt.

7. A compound according to claim 2, 6α-fluoro-11β,17α,21-trihydroxy-16α-methylpregn - 4 - ene - 3,20-dione 21-phosphite sodium salt.

8. A compound according to claim 2, 6α-fluoro-11β,17α, 21 - trihydroxy - 16α - methylpregna-1,4-diene-3,20-dione 21-phosphite sodium salt.

9. A compound according to claim 2, 6α,9α-difluoro-11β,17α,21-trihydroxy-16α - methylpregn - 4 - ene - 3,20-dione 21-phosphite sodium salt.

10. A compound according to claim 2, 6α,9α-difluoro-11β,17α,21-trihydroxy-16α-methylpregna - 1,4 - diene-3,20-dione 21-phosphite sodium salt.

11. A compound according to claim 2, 6α-fluoro-11β,21 - dihydroxy - 16α - methyl - 20-oxo-2'-(p-fluorophenyl)-pregn-4-eno[3,2-C]pyrazole 21 - phosphite sodium salt.

12. A compound according to claim 2, 6α,9α-difluoro-11β,21 - dihydroxy - 16α - methyl - 20 - oxo - 2' - (p-fluorophenyl)pregn - 4 - eno[3,2-c] pyrazole 21 - phosphite sodium salt.

13. A compound according to claim 2, 6α-fluoro-11β,17α,21-trihydroxy - 16α - methyl - 20 - oxo - 2' - (p-fluorophenyl)pregn - 4 - eno[3,2-C] pyrazole 21-phosphite sodium salt.

14. A compound according to claim 2, 6α,9α-difluoro-11β,17α,21 - trihydroxy - 16α - methyl - 20 - oxo - 2'-(p-fluorophenyl)pregn - 4 - eno[3,2-C]pyrazole 21-phosphite sodium salt.

15. A compound according to claim 2, 3,17β-dihydroxyestra - 1,3,5(10)-triene 17β-phosphite sodium salt.

16. A compound according to claim 2, 3-methoxy-17β-hydroxyestra - 1,3,5(10) - triene 17β-phosphite sodium salt.

17. A compound according to claim 2, 3,17β-dihydroxy-17α-ethynylestra-1,3,5(10)-triene 3-phosphite sodium salt.

18. A process for the preparation of the compounds of claim 1 which comprises treating a hydroxy steroid selected from the group consisting of 3-hydroxy steroids, 17β-hydroxy steroids, and 21-hydroxy steroids, with phosphorous acid and a disubstituted carbodiimide selected from the group consisting of dialkyl carbodiimides, dicycloalkyl carbodiimide, and diaryl carbodiimides, to obtain the corresponding steroid phosphite; and treating the thus obtained steroid phosphite with an ammonium hydroxide or alkali metal hydroxide to obtain the corresponding salt of the steroid phosphite.

19. The process according to claim 18 wherein the hydroxy steroid is treated with phosphorous acid and said disubstituted carbodiimide in the presence of a weak base.

20. The process according to claim 19 wherein the disubstituted carbodiimide is dicyclohexyl carbodiimide, the alkali metal hydroxide is sodium hydroxide and the weak base is pyridine.

21. The process according to claim 20 wherein the hydroxy steroid is a 21-hydroxy steroid of the pregnane series.

22. The process according to claim 20 wherein the hydroxy steroid is a 17β-hydroxy steroid of the estrane or androstane series.

23. The process according to claim 20 wherein the hydroxy steroid is a 3-hydroxy steroid of the estrane series.

24. A process for the preparation of the compounds of claim 1 which comprises treating a hydroxy steroid selected from the group consisting of 3-hydroxy steroids, 17β-hydroxy steroids, and 21-hydroxy steroids, with a trisubstituted phosphite selected from the group consisting of trimethylphosphite, triethylphosphite, tripropylphosphite, triphenylphosphite, and tritolylphosphite, and a hydrogen halide to obtain the corresponding steroid phosphite; and treating the thus obtained steroid phosphite with an alkali metal hydroxide or ammonium hydroxide to obtain the corresponding salt of the steroid phosphite.

25. The process according to claim 24 wherein the trisubstituted phosphite is triphenyl phosphite, the alkali metal hydroxide is sodium hydroxide, and the hydrogen halide is hydrogen chloride.

No references cited.

HENRY A. FRENCH, Primary Examiner

U.S. Cl. X.R.

260—239.55, 397.4, 397.5, 397.45, 999